INVENTOR
H. SEIDEL
BY
Sylvan Sherman
ATTORNEY 3,500,259
Patented Mar. 10, 1970

3,500,259

FILTER CIRCUITS USING ALTERNATE OPEN-AND SHORT-CIRCUITED 3 db QUADRATURE HYBRIDS

Harold Seidel, Warren Township, Somerset County, N.J., assignor to Bell Telephone Laboratories, Incorporated, Murray Hill and Berkeley Heights, N.J., a corporation of New York Filed Sept. 29, 1967, Ser. No. 671,649
Int. Cl. H03h 5/06, 7/10
U.S. Cl. 333—26 4 Claims

ABSTRACT OF THE DISCLOSURE

The invention described in this application is based upon the recognition that an open-circuited 3 db quadrature hybrid is equivalent to one or more suitably spaced, series-connected circuits, series resonant at the 3 db coupling frequency of the hybrid, whereas a short-circuited 3 db quadrature hybrid is equivalent to one or more suitably spaced shunt-connected circuits, parallel resonant at the hybrid's 3 db coupling frequency. As such, entire filter structures can be constructed using solely open-circuited and short-circuited 3 db quadrature couplers.

Because the phase of the output signal from an open-circuited coupler differs by 180 degrees from that of a short-circuited coupler, two dual filters, each containing an odd number of couplers, can be employed as a transformer for coupling an unbalanced signal source to a balanced load.

This invention relates to filter circuits using open-circuited and short-circuited 3 db quadrature hybrids.

BACKGROUND OF THE INVENTION

It is customary to think of circuits in terms of inductors, capacitors and resistors. These components, in addition to being the traditional circuit components, can be made sufficiently small and inexpensively to permit their use in large numbers. Recently, other circuit components, such as the quadrature hybrid junction, have been developed to such a state where they too can be made very small and inexpensively thus providing the circuit designer with an additional, basic circuit component having a variety of interesting and useful properties.

SUMMARY OF THE INVENTION

The present invention is based upon the recognition that an open-circuited 3 db quadrature coupler is equivalent to one or more, suitably spaced, series-connected circuits, series resonant at the 3 db coupling frequency of the hybrid, whereas a short-circuited quadrature hybrid is equivalent to one or more, suitably spaced, shunt-connected circuits, parallel resonant at the hybrid's 3 db coupling frequency.

In accordance with the invention, open-circuited and short-circuited quadrature couplers are connected in series to produce a multi-section band-pass filter. The impedance of the respective equivalent filter sections is determined by the characteristic impedance of the hybrid coupler. Thus, it is a relatively simple matter to design filter sections having arbitrary pass-band and impedance-matching characteristics, using neither capacitors nor inductors, as such, merely by appropriately selecting the characteristic impedances and the center frequencies of the quadrature hybrids making up the filter.

Because the phase of the output signal from an open-circuited coupler differs by 180 degrees from that of a short-circuited coupler, two dual filters, each containing an odd number of couplers, can be employed as a transformer for coupling an unbalanced signal source to a balanced load.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
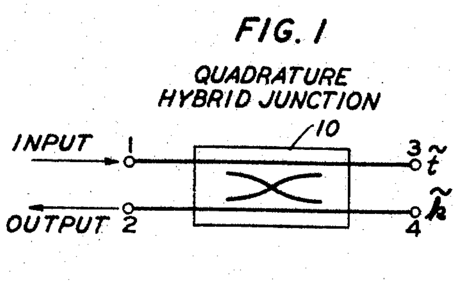
FIG. 1 shows, in block diagram, an open-circuited, quadrature hybrid junction.

Referring to the drawings, a quadrature hybrid junction 10 is represented in FIG. 1. The term quadrature hybrid junction (or quadrature coupler), is used in its accepted sense to describe a power-dividing network having four branches (or ports) in which the branches are arranged in pairs, with the branches comprising each pair being conjugate to each other but in coupling relationship to the branches of the other of said pairs. In particular quadrature couplers are characterized by a scattering matrix which is symmetrical with respect to both diagonals and independent of the order in which the branches are selected. This includes a large variety of couplers such as the Riblet coupler (H. J. Riblet, "The Short-Slot Hybrid Junction," Proceedings of the Institute of Radio Engineers, February 1952, pages 180–184), the multihole directional coupler (S. E. Miller, "Coupled Wave Theory and Waveguide Applications," Bell System Technical Journal, May 1954, pages 661–719), the semi-optical directional coupler (E. A. J. Marcatili, "A Circular Electric Hybrid Junction and Some Channel-Dropping Filters," Bell System Technical Journal, January 1961, pages 185–196), the strip transmission line directional coupler (T. K. Shimizu "Strip-line 3 db Directional Coupler," 1957 Institute of Radio Engineers, Wescon Convention Record, vol. 1, part 1, pages 4–15), and the lumped-element quadrature hybrids sold by Merrimac Research and Development, Inc., as advertised, for example, in the September 1966 issue of Microwave Journal. In each of the above-mentioned power dividers, there is a 90 degree relative phase difference betwen the two output signal components, hence the designation "quadrature" coupler or "quadrature" hybrid. In addition, the hybrids of interest are those which divide the incident power into two equal components at some center frequency. Such hybrids are characterized as "3 db" hybrids. Accordingly, to avoid unnecessary repetition hereafter, the use herein of such terms as "hybrid" or "coupler" shall be understood to refer, more specifically, to a 3 db quadrature hybrid junction.

Figure 2A:
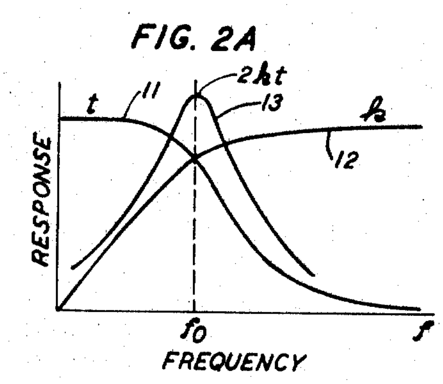
FIGS. 2A and 2B, included for purposes of explanation, show the signals as a function of frequency at the several branches of an open-circuited lumped-element hybrid, and an open-circuited transmission line type hybrid, respectively.

Referring again to FIG. 1, the four branches of hybrid 10 are designated 1, 2, 3 and 4, of which branches 1 and 2 constitute one pair of conjugate branches, and branches 3 and 4 the other pair. In operation, an input signal, coupled to branch 1, is divided into two quadrature components $$\tilde{t} \text{ and } \tilde{k}$$

in branches 3 and 4, respectively. For a lumped-element hybrid the variations in amplitude of these two signal components, as a function of frequency, are represented in FIG. 2 by curves 11 and 12. Basically, the $t$ component is a maximum at the lower frequencies and falls off as the frequency increases, whereas the $k$ component is minimum at the lower frequencies, and increases as the frequency increases. The two are equal in amplitude at some intermediate frequency $f_0$.

With branches 3 and 4 open-circuited, as illustrated in FIG. 1, the signal components in branches 3 and 4 are reflected back toward branches 1 and 2. The portion of the $\tilde{t}$ component coupled to branch 1 is equal to $$\Gamma\tilde{t}^2$$

while the portion coupled to branch 2 is equal to $$\tilde{t}\tilde{k}\Gamma$$

where $\Gamma$ is the coefficient of reflection. Assuming a perfect open circuit, $\Gamma$ is equal to one, and will be omitted hereafter.

Similarly, the $\tilde{k}$ component couples a component $\tilde{k}^2$ to branch 1 and a component $$\tilde{k}\tilde{t}$$

to branch 2. Thus, the total reflected signal is equal to $$\tilde{t}^2+\tilde{k}^2$$

in branch 1 and $$2\tilde{k}\tilde{t}$$

in branch 2. Recognizing that at frequency $f_0$, $|t|=|k|$, and that $$\tilde{t} \text{ and } \tilde{k}$$

are 90 degrees out of phase, the reflected signal in branch 1 is zero and all the signal is coupled to branch 2. This, of course, is one of the well-known properties of a 3 db quadrature coupler.

Figure 3A:
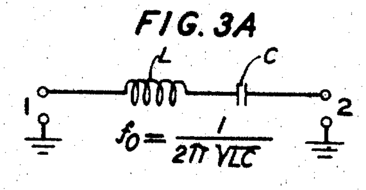
FIGS. 3A and 3B show the lumped-element and the transmission line equivalent circuits of the hybrid of FIG. 1.

If the reflected signal, $$2\tilde{k}\tilde{t}$$

is examined as a function of frequency, (curve 13, FIG. 2A), it is seen to have a typical resonance characteristic, peaking at center frequency $f_0$, and decreasing as the frequency deviates from $f_0$. In fact, it can readily be shown that with respect to branches 1 and 2, the open-circuited quadrature hybrid illustrated in FIG. 1 is equivalent to a series-connected circuit, series resonant at frequency $f_0$. For the lumped-element quadrature hybrid, the equivalent circuit, shown in FIG. 3A, comprises a series-connected inductor L and capacitor C, where L and C are related by $$f_0=\frac{1}{2\pi\sqrt{LC}}$$

and $$z_0=\sqrt{\frac{L}{C}}$$

where $Z_0$ is the characteristic impedance of the hybrid.

Figure 2B:
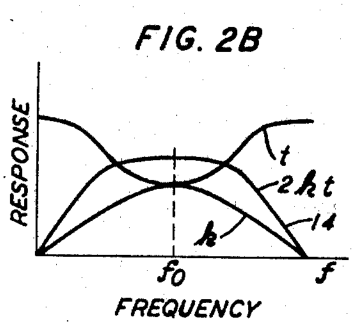
Figure 3B:
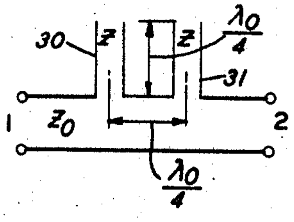

FIG. 2B shows the variations of $k$, $t$ and the product $2kt$, as a function of frequency, for a transmission line type quadrature coupler. It will be noted that the product curve 14 tends to be flatter than curve 13 in FIG. 2A. In this connection, it can be shown that this response is equivalent to a multiple-resonant circuit, such as shown in FIG. 3B, comprising two quarter-wave, open-circuited studs 30 and 31, separated by a distance equivalent to a quarter of a wave length, all measured at frequency $f_0$.

The characteristic impedance Z of stubs 30 and 31 is given by $$Z=(\sqrt{2}-1)Z_0$$

where $Z_0$ is the characteristic impedance of the hybrid.

Figure 4:
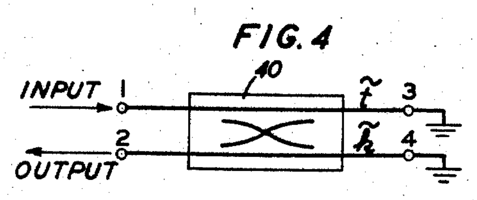
FIG. 4 shows, in block diagram, a short-circuited quadrature hybrid junction.

A similar analysis can be made for the short-circuited quadrature hybrid 40 illustrated in FIG. 4. This analysis shows that the short-circuited hybrid is the dual of the open-circuited hybrid and, thus, can be represented as a shunt-connected, parallel resonant circuit. In addition, because the coefficient of reflection of a short circuit is −1, the reflected signal at branch 2 is now equal to $$-2\tilde{k}\tilde{t}$$

Figure 5A:
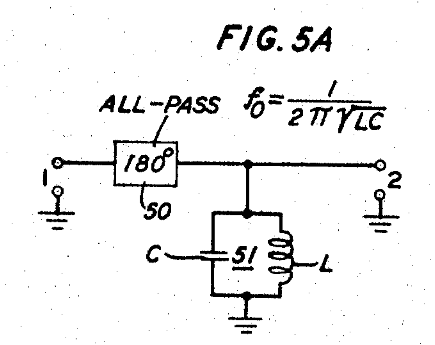
FIGS. 5A and 5B show the lumped-element and the transmission line equivalent circuits of the hybrid of FIG. 4.

The negative sign indicates a 180 degree phase shift. Accordingly, the complete equivalent circuit of a short-circuited hybrid includes, in addition to a resonant circuit, an all-pass, 180 degree phase shifter. Thus, the lumped-element equivalent circuit of the short-circuited hybrid, as illustrated in FIG. 5A, includes an all-pass, 180 degree phase shifter 50, and a shunt-connected, parallel resonant circuit 51 comprising an inductor L and a capacitor C. L and C, as before, are related by $$f_0=\frac{1}{2\pi\sqrt{LC}}$$

and $$z_0=\sqrt{\frac{L}{C}}$$

where $Z_0$ is the characteristic impedance of the hybrid.

Figure 5B:
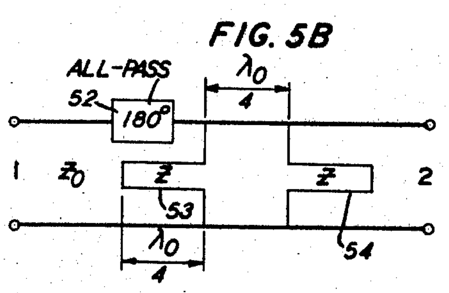

The transmission line equivalent circuit of a short-circuited transmission line type hybrid, shown in FIG. 5B, comprises an all-pass, 180 degree phase shifter 52, and two shunt-connected, short-circuited quarter-wave stubs 53 and 54, separated by a distance $\lambda_0/4$. For a strip transmission line type hybrid, the characteristic impedance of the stubs, Z, is equal to $$(\sqrt{2}-1)Z_0$$

where $Z_0$ is the characteristic impedance of the hybrid.

Figure 6:
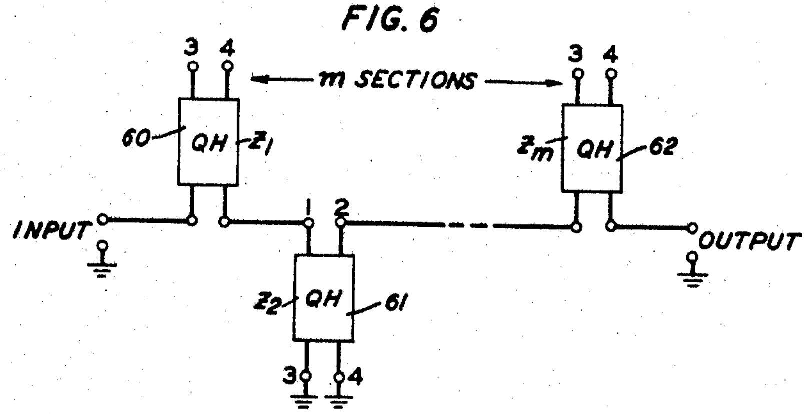
FIG. 6 shows a filter using a plurality of open- and short-circuited hybrids, alternately connected in series.

Having recognized the equivalent resonant properties of the open-circuited quadrature coupler, and of its dual, the short-circuited quadrature coupler, entire filter circuits can be built using only combinations of open-circuited quadrature couplers. The simplest filter comprises the series combination of one open-circuited and one short-circuited coupler. More generally, a filter having any arbitrary number of sections 60, 61 . . . 62 can be made, where successive sections are alternately open-circuited and short-circuited couplers, as illustrated in FIG. 6. In general, the section impedances $Z_1, Z_2 \ldots Z_m$ of the several sections can assume any arbitrary values, depending upon the filter transfer characteristics desired. In the special case where $Z_1=Z_2= \ldots Zm$, a constant-$k$ type filter is obtained.

Figure 7:
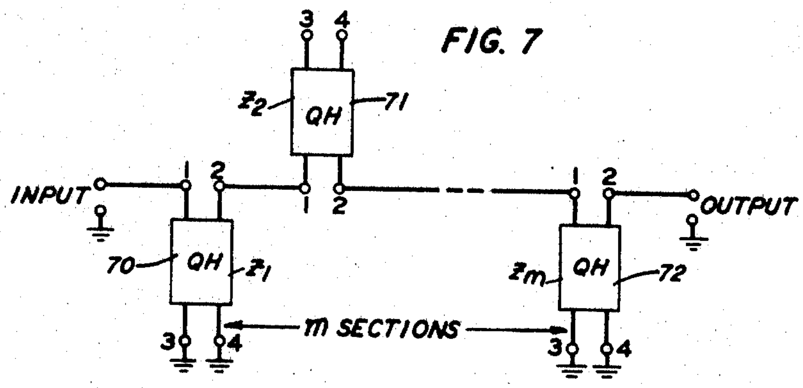
FIG. 7 shows the dual of the filter shown in FIG. 6.

Alternatively, the dual of the filter shown in FIG. 6 can be devised simply by substituting for each of the couplers 60, 61 . . . 62, its dual. Thus, as illustrated in FIG. 7, a short-circuited coupler 70 is substituted for open-circuited coupler 60, whereas an open-circuited coupler 71 is substituted for short-circuited coupler 61, et cetera. As is known, the band-pass characteristics of these two, dual filter structures are the same.

Figure 8:
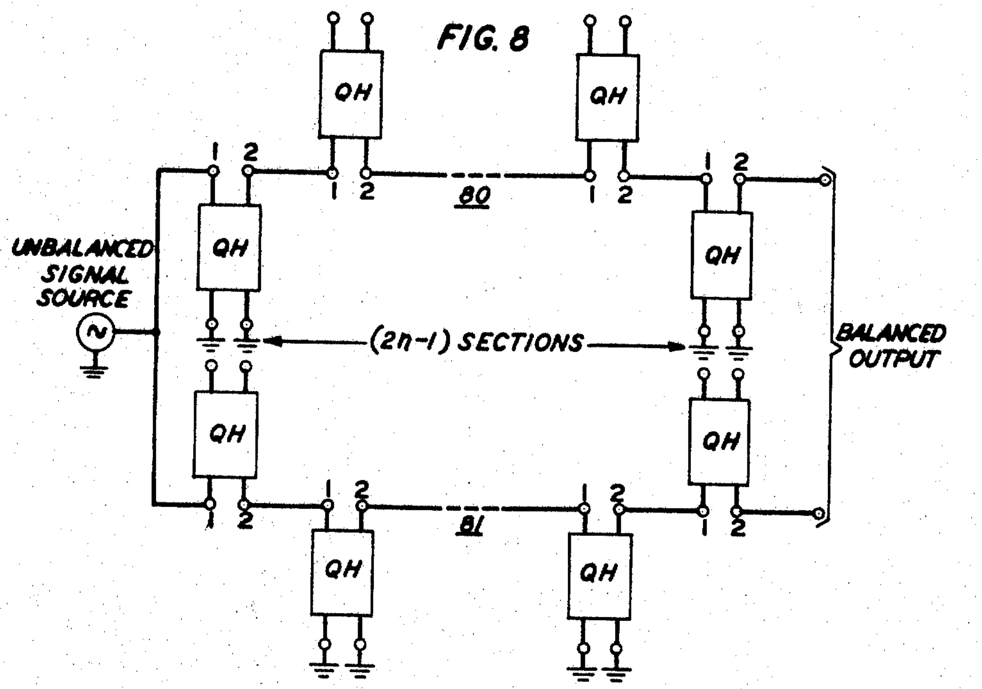
FIG. 8 shows an arrangement for obtaining a balanced output signal from an unbalanced signal source.

As was noted previously, there is an all-pass 180 degree phase shift associated with the output signal derived from the short-circuited coupler. This conveniently obtained, broadband phase shift makes it relatively simple to obtain a balanced output from an unbalanced signal source by using two dual filters having an odd number of sections, as illustrated in FIG. 8. In this arrangement, an unbalanced signal source 79 is connected to two dual filter circuits 80 and 81, each comprising an odd number, $(2n-1)$, of sections, where $n$ is any integer 1, 2 . . . $n$.

Because there is one more short-circuited coupler in filter circuit 80 than there is in the dual filter circuit 81, the two output signals are 180 degrees out of phase. In all other respects, however, the filter transfer characteristics of the two filters are the same, thus providing a convenient means of obtaining a balanced output from a broadband unbalanced signal source. This, typically, cannot always be obtained using a conventional transformer.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. A filter structure comprising:

at least one open-circuited 3 db quadrature hybrid junction connected in series with at least one short-circuited 3 db quadrature hybrid junction.

2. The filter according to claim 1 wherein said hybrids are lumped-element hybrids.

3. The filter according to claim 1 wherein said hybrids are transmission line type hybrids.

4. A circuit for deriving balanced output signals from an unbalanced signal source, comprising:

a pair of dual filters, each including:

an odd number of open-circuited and short-circuited 3 db quadrature hybrid junctions, connected alternately in series;

one end of each filter being coupled to said signal source; and the balanced signals being obtained at the other ends of said filters.

References Cited

UNITED STATES PATENTS

| | | | |
|---|---|---|---|
| 2,908,813 | 10/1959 | Morrison | 333—10 |
| 2,942,209 | 6/1960 | Cohn | 333—10 |
| 3,277,403 | 10/1966 | Cohn | 333—10 X |
| 3,337,821 | 8/1967 | Engelbrecht | 333—11 X |
| 3,435,384 | 3/1969 | Renkowitz | 333—73 |

OTHER REFERENCES

Matthaei, George L., "Design of Wide Band (and Narrow Band) Band Pass Microwave Filters on the Insertion Loss Basis," Ire Trans. on Microwave Theory and Tech., MTT–8, 1960, pp. 580–593.

Matthaei et al., "Microwave Filters, Impedance Matching Networks, and Coupling Structures," chapter 13, pp. 775–809, McGraw-Hill, 1964.

Jones et al., "Coupled-Strip-Transmission Line Filters and Directional Couplers," Ire Trans. on Microwave Theory and Tech. MTT–4, 1956, pp. 75–81.

HERMAN KARL SAALBACH, Primary Examiner

W. H. PUNTER, Assistant Examiner

U.S. Cl. X.R.

333—11, 73

Disclaimer 3,500,259.—*Harold Seidel*, Warren Township, Somerset County, N.J. FILTER CIRCUITS USING ALTERNATE OPEN- AND SHORT-CIRCUITED 3 db QUADRATURE HYBRIDS. Patent dated Mar. 10, 1970. Disclaimer filed June 14, 1972, by the assignee, *Bell Telephone Laboratories, Incorporated.*

Hereby enters this disclaimer to claims 1 and 3 of said patent.

[*Official Gazette January 16, 1973.*]